Feb. 12, 1935.  W. E. GWALTNEY  1,991,090
LAMINATED MATERIAL
Filed June 16, 1930
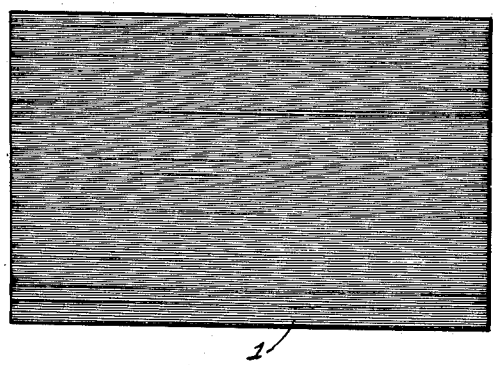
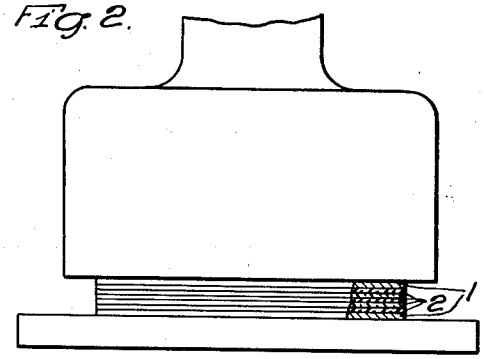
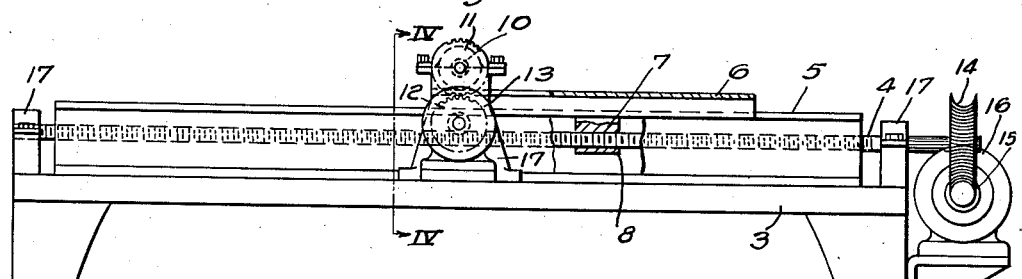
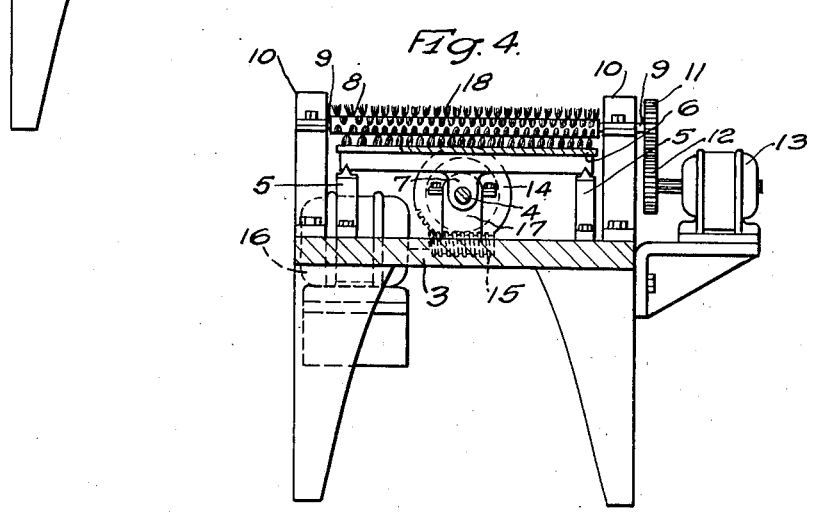
INVENTOR
William E. Gwaltney.
BY
Wesley G. Carr
ATTORNEY Patented Feb. 12, 1935

1,991,090

UNITED STATES PATENT OFFICE 1,991,090

LAMINATED MATERIAL

William E. Gwaltney, Trafford, Pa., assignor to Westinghouse Electric & Manufacturing Company, a corporation of Pennsylvania Application June 16, 1930, Serial No. 461,284

5 Claims. (Cl. 154—2)

My invention relates to composite laminated material and more particularly to methods of producing composite plates of such material which have an exterior satin-like finish.

The principal object of my invention is to provide a method of producing laminated material which comprises interposing a plurality of layers of fibrous material, the outer sheets of which have prints thereon resembling wood between plates which have been etched or treated in a specified manner and molding the sheets under heat and pressure, thereby producing a final article having an exterior finish closely resembling the best grades of hand-rubbed hard woods.

In manufacturing laminated sheet material, fibrous sheets are first impregnated with a binder which is capable of being hardened under heat and pressure, such as a phenolic condensation product or one of the various urea or thiourea resins, or mixtures thereof, and a plurality of such sheets are subjected to heat and pressure between polished metallic plates to form a composite article. In certain embodiments, it is desirable to produce a finish resembling wood or some fabric. It has, accordingly, been the practice to utilize outer sheets having designs printed thereon resembling the design of the kind of material to be represented.

Laminated articles produced in such manner, however, are not entirely satisfactory because, when highly polished pressing plates are employed, a finished product is obtained that has a more or less wavy appearance which is not pleasing to the eye and is readily distinguishable from wood having a hand-rubbed finish.

Various attempts have been made to etch or score the surfaces of the metallic plates which are placed in contact with the laminated sheets during the molding operation, so that a satin-like finish will be imparted to the finished article. For example, they have been subjected to a sand-blasting operation in which different pressures of air and various abrasives were utilized. Attempts were also made to treat the plates with the usual sanding machines. The results, however, were not satisfactory because, when pressing plates treated in the manner specified were employed as the contacting sheets in producing laminated articles, a dull, bloom effect was imparted to the finished product, and, although the wavy, polished appearance was removed, the design of the surface sheets appeared lifeless, and the finished article did not have the desired satin-like finish.

Upon making a microscopical examination of the composite sheets of molded material produced by the foregoing methods, it was found that the dull effect was caused by high and low spots in the finished article which refracted the light in such manner that a dull bloom or lifeless effect was produced.

I have discovered, however, that, if the surfaces of the plates which come into contact with the laminated articles during the molding operation are treated by a special process, they will impart the desired finish to the surface of the molded material, and, when the outer sheets have designs printed thereon resembling wood, a product will be produced which resembles the best grades of hand-rubbed wood.

My invention will be better understood by referring to the accompanying drawing, in which Figure 1 is a plan view of a plate etched by my improved process;

Fig. 2 is an elevational view of a press showing the treated plates in partial cross section and a plurality of laminated sheets interposed between the plates;

Fig. 3 is an elevational view of an apparatus for moving the plate in contact with a rotating brush; and Fig. 4 is a cross sectional view of the apparatus, taken on the line IV—IV of Fig. 3.

Referring to Figs. 1 and 2 of the drawing, the numeral 1 designates a plate which has been treated by my process. My improved plates may be utilized for molding fibrous sheet material in a manner well known in the art. For example, the treated surfaces of a pair of plates are placed in engagement with a plurality of sheets of fibrous material which have been impregnated with a suitable binder, such as a phenolic condensation product, as shown at 2 in Fig. 2 of the drawing. Heat and pressure are then applied, in the usual manner, to harden the binder and form the composite article.

My improved method of producing the satin-finish on the plate is illustrated in Figs. 3 and 4 of the drawing, in which the numeral 3 designates a table or bench which serves as a support for a screw-threaded shaft 4. Extending upwardly from the table 3, are brackets 5 which support a table 6 on which the plate 1 to be treated is placed. The table 6 is provided with a downwardly-extending lug 7, having an aperture therein which is in screw-threaded engagement with the shaft 4. A brush 8, provided with a pair of pintles 9, is journalled in bearings 10. One of the pintles 9 is extended through the bearing 10 and is provided with a gear wheel 11 that meshes with a gear wheel 12 which is attached to the shaft of motor 13. The shaft 4 is also provided with a worm gear wheel 14 which meshes with a worm 15 formed upon the shaft of a motor 16.

During the operation of the device, the motor 16, in conjunction with the gear wheels 14 and 15, rotates the shaft 4 in bearings provided in supports 17. As the shaft rotates, the table 6, the lug 7 of which is in screw-threaded engagement with the shaft, is moved forward to bring the plate 1 into contact with the brush 8. The brush 8 is provided with wire bristles 18 and is rotated at a definite speed by means of the motor 13, the gear 12, on the shaft of which, meshes with the gear 11 attached to the pintle 9 of the brush. The plates are successively moved forward and backward, until the desired finish is produced. I have found that, where the plate is moved in contact with the brush from 10 to 50 times, the desired finish is obtained.

In order to produce the desired results, the bristles of the brush must be of a definite size. The speed at which the brush is rotated over the plate must also be maintained within certain definite limits. Satisfactory results will be produced when a brush having a diameter ranging from .008 of an inch to .01 of an inch is utilized and the peripheral speed of the brush is maintained at 3000 to 3800 feet per minute.

A peripheral speed below 3000 feet per minute gives a crystalline effect to the surface which produces a bloom that is imparted to the finished laminated sheet during the molding operation, and, when the peripheral speed is maintained above 3800 feet per minute, a polished effect is obtained. A wire brush having bristles .009 of an inch in diameter produces a smooth, satin-finish, while a larger wire, for example, one having a diameter of .012 of an inch, gives a coarser finish, and the treated surface has a crystalline appearance. In actual practice, I have found that, by employing a brush provided with bristles each having a diameter of .009 of an inch, and revolving the brush at a peripheral speed of approximately 3300 revolutions per minute, a satin-finish is produced which is free from scratches and high and low spots, even when highly magnified.

As will be readily understood, the friction of the wire brush upon the surface of the plate during the process generates a certain amount of heat which is necessary for the successful operation of the process. The temperature of the plate, however, should not be permitted to exceed 105° C.; otherwise, a glossy effect will be produced. I prefer to conduct the process in such manner that, as the plate moves uniformly in contact with the bristles of the brush, the rotation of the brush will be maintained at such speed that sufficient heat will be generated by friction to maintain the plate at a temperature of 90° to 100° C.

After the plate has been provided with a satin finish, an electrodeposited layer of chromium may be deposited upon its surface. The chromium not only increases the hardness of the pressing plate but also increases its resistance to corrosion. A chromium-plated pressing plate, however, is not absolutely essential, as good results have been obtained with other metals.

While I have described my invention in considerable detail and have disclosed specific embodiments, it will be understood that I do not desire to limit myself to the foregoing examples, which should be construed as illustrative and not by way of limitation. For example, any desired method of uniformly moving the plate in contact with the brush may be provided, or, if desired, the plate may be maintained stationary and the rotating brush moved uniformly over its surface.

If the temperature of the plate during the operation of the process has the tendency to exceed 100° C., it may be cooled by passing cooling fluid through the supporting table 6, in which event, the rotative speed of the brush may be increased. In the particular examples given, I have specified that my improved pressing plates are particularly desirable for producing a satin finish on laminated material having outer surfaces resembling wood. I do not desire to limit my invention in this respect, however, because, obviously, they may be utilized in molding laminated articles, such as panels, in which the outer sheet is formed in solid colors or on which various designs are printed.

Other modifications of my invention will become apparent to those skilled in the art. I desire, therefore, that only such limitations shall be imposed thereon as are required by the prior art and the appended claims.

I claim as my invention:

1. A laminated article comprising a plurality of layers of sheet material cemented together by a heat-hardened binder, the surfaces of the outer layers of said sheets having a satin-like finish.

2. A laminated product comprising a plurality of layers of sheet material bound together by a heat-hardened binder, the surface sheets having prints thereon resembling wood and being characterized by having a finish resembling hand-rubbed wood.

3. The process of producing a laminated article which comprises impregnating a plurality of sheets of fibrous material with a binder capable of being hardened under heat and pressure, interposing the sheets between plates having a satin-finish and molding the sheets together into a composite structure under heat and pressure.

4. The process of producing a laminated article having a surface resembling the grain of wood which comprises impregnating a plurality of sheets of fibrous material with a binder, interposing said sheets between two sheets of fabric having prints thereon resembling wood which are also impregnated with a binder, placing pressing plates having a satin-like finish in engagement with the assembled layers and molding the sheets together under heat and pressure to form a composite article.

5. The process of producing a laminated article having a surface resembling the grain of hand-rubbed wood which comprises assembling a plurality of layers of fibrous material with a phenolic condensation product, interposing the layers between two sheets of fibrous material having prints thereon resembling wood, placing a metallic pressing plate having a satin-finished surface in engagement with the assembled layers and molding the fibrous material under heat and pressure, thereby imparting a finish to the composite article resembling hand-rubbed wood.

WILLIAM E. GWALTNEY.